United States Patent [19]

Hain et al.

[11] 3,920,850

[45] Nov. 18, 1975

[54] METHOD OF PRESERVING AND PACKAGING CHEESE

[75] Inventors: Gottfried Hain, Lehen; Christian Pellikan, Rott, Inn; Hans Haas, Lehen, all of Germany

[73] Assignee: ALPMA Alpenland-Maschinenbau Hain & Co. KG, Rott, Inn, Germany

[22] Filed: Apr. 23, 1973

[21] Appl. No.: 353,636

[30] Foreign Application Priority Data

Apr. 21, 1972 Germany.............................. 2219577

[52] U.S. Cl. ................ 426/394; 426/409; 426/411; 426/412; 426/522
[51] Int. Cl.² ........................................ A23C 19/14
[58] Field of Search ........... 426/394, 411, 412, 414, 426/521, 222, 407, 409, 522, 392

[56] References Cited
UNITED STATES PATENTS

| | | |
|---|---|---|
| 1,415,943 | 5/1922 | Meyers ................................ 426/212 |
| 2,777,770 | 1/1957 | Fisher ................................. 426/411 |
| 2,904,441 | 9/1959 | Grindrod ............................ 426/412 |
| 2,982,661 | 5/1961 | Thompson .......................... 426/411 |
| 3,060,035 | 10/1962 | Berst ................................... 426/323 |
| 3,734,750 | 5/1973 | Ludeman ............................ 426/394 |

Primary Examiner—Norman Yudkoff
Assistant Examiner—Curtis P. Ribando
Attorney, Agent, or Firm—Karl F. Ross; Herbert Dubno

[57] ABSTRACT

Pieces of aged soft cheese are wrapped and shaped in foil material and assembled under slight mechanical (shaping or shape-retaining) pressure in a sterilization container which has a cross-section which is substantially identical with the cross-section of the wrapped pieces. The container and the wrapped pieces are sterilized by heating and then cooled. The cooled wrapped pieces are quickly removed from the container and immediately packed, individually and airtightly, in marketable containers.

1 Claim, 2 Drawing Figures

METHOD OF PRESERVING AND PACKAGING CHEESE

FIELD OF THE INVENTION

Our present invention relates to a method of preserving pieces of cheese and airtightly packing the same.

BACKGROUND OF THE INVENTION

Naturally aged cheese, such as Camembert, Brie and similar soft cheeses, is durable only for a limited period of time. The aging process, as a rule, lasts for only a few weeks. Aging condition and taste vary during this time from day to day. The storage and marketing conditions of such soft cheeses are thus very much influenced and jeopardized by this quickly developing aging process.

Efforts have been made in the past to make aged cheese durable. Successful results have been obtained by sterilization of the aged cheese. Aged pieces of cheese can, according to one known method, be wrapped in aluminum foil; the wrapped pieces are enclosed in a can and several such cans and their contents are sterilized under slightly reduced pressure. This method, however, requires a considerable expenditure of individual cans and work, and increasing packaging costs have in several instances made this method uneconomical.

Efforts have also been made to replace the individual receptacles with less expensive containers made of synthetic materials. However, considerable difficulties have been encountered because synthetic-resin materials, for example, have had a tendency to be deleteriously affected by being heated to the sterilization temperature, namely over 90°C. It is possible to select foil materials which are resistant at these temperatures but their appearance deteriorates considerably during the sterilization process. Furthermore, the rigidity of such a foil material is not sufficient to make wrapped pieces of cheese retain their shape during sterilization. Thus, selected and tested methods for the sterilization and packaging of aged soft cheese have not met reasonable requirements of economy, appearance, structural stability and strength.

OBJECTS OF THE INVENTION

The object of our invention is to provide a method for preserving and packing cheese, especially aged soft cheese, which is simple and economical yet conducive to a marketable treatment and packing thereof.

SUMMARY OF THE INVENTION

Our method for preserving and packing cheese comprises wrapping pieces of cheese, especially aged soft cheese, assembling the wrapped pieces in a sterilization container, sterilizing the container and the wrapped pieces, removing the wrapped pieces from the container, and individually and airtightly packing the wrapped pieces.

A device for accomplishing the preservation steps of our aforedescribed method comprises a tube-shaped sterilization container with an inner surface which bounds a space configured to accommodate wrapped pieces of cheese, with a cross-section which is substantially the same as the cross-section of the wrapped pieces of cheese, and with an open end; and airtight closure means for the open end of the sterilization container which can be inserted to any desired depth therein.

Pieces of cheese can, in accordance with our invention, be wrapped in conventional packing foil, e.g. of synthetic resin, paper or aluminum. A number of such wrapped pieces are then assembled in the sterilization container which has a cross-section which is substantially the same as the cross-section of the wrapped pieces of cheese. The wrapped pieces of cheese are then sterilized and quickly removed from the sterilization container whereupon the individual wrapped pieces of cheese are airtightly packed.

We have found that it is particularly advantageous to avoid airtight closure of the sterilization container after the assembly of the wrapped pieces of partially aged cheese (up to three-fourths of the requisite aging) therein before the cheese has reached the desired degree of aging and to continue the aging in the container. The wrapped pieces of cheese assembled in the open sterilization container should be stored and aged under climatically optimal conditions so that the most desirable taste and aroma qualities of the cheese can be developed before the aging process is interrupted by sealing the container and sterilizing as described.

Certain types of cheese evolve gas during sterilization and the aging process, and it is then advantageous to establish a slightly reduced temperature in the sterilization container before the sterilization step.

We also prefer to cool the wrapped pieces of cheese while they are still airtightly assembled in the sterilization container, so that they are dimensionally stabilized and can be packed airtightly immediately after their removal from the container.

One preferred embodiment of the device by which our method can be practiced has closure means which can be applied quickly for airtight sealing of the sterilization container and can be unlocked quickly. The closure means can be made slidable inside the container and is provided with locking means for airtight sealing between the inner surface of the container and the surfaces of the locking means at a selected location inside the container.

The locking means can comprise two discs which will easily fit inside the sterilization container. The discs can have a common shaft on which they are axially and adjustably mounted. An annular sealing means (e.g. of elastomeric material) is positioned between the discs and is squeezed between the surfaces of the discs against the inner surface of the container when the discs are caused to approach each other along the common shaft. Thus, the region of the sterilization container which contains the wrapped pieces of cheese will be sealed off.

The use of at least one slidable closure which can seal off the sterilization at a selected location allows assembling the wrapped pieces of cheese so that they exert a slight pressure on each other. They can stay in place even if there are slight dimensional differences between them.

The wrapped pieces of cheese substantially retain their shape during the sterilization process if they are assembled in such a container, but they may also be reshaped during the sterilization process if they display any configuration irregularity in relation to the bulk of the assembled wrapped pieces. The container holds the assembled wrapped pieces like a mold during the heating and softening of the cheese. The design of the sterilization container also makes it possible to assemble many wrapped pieces of cheese quickly and easily, and to handle and transport the container in a convenient manner. The wrapped pieces of cheese are also protected from various kinds of damage while assembled inside the container. Also, the airtight packing material will be applied first after the sterilization process has been completed, and then attractive and possibly printed foils of synthetic materials of a wide variety can be selected for this purpose.

The wrapped and sterilized pieces of cheese can be fed to a packing machine in a direct and easy manner thanks to the tubular shape of the sterilization container, and this can be done without any auxiliary devices. The wrapped and sterilized pieces can also be deposited on a cup type packing machine directly from the sterilization container. Thus, the sterilization container makes possible a completely automatic preservation and packing operation.

BRIEF DESCRIPTION OF THE DRAWING

The manner in which pieces of cheese are wrapped, wrapped pieces are assembled in sterilization containers, such containers are stored, subjected to sterilization treatment and cooled, and the sterilized wrapped pieces of cheese are removed from the containers and individually packed, and the design of a sterilization container used to practice the invention, will become more readily apparent from the following description, reference being made to the accompanying drawing in which.

SPECIFIC DESCRIPTION

Figure 1:
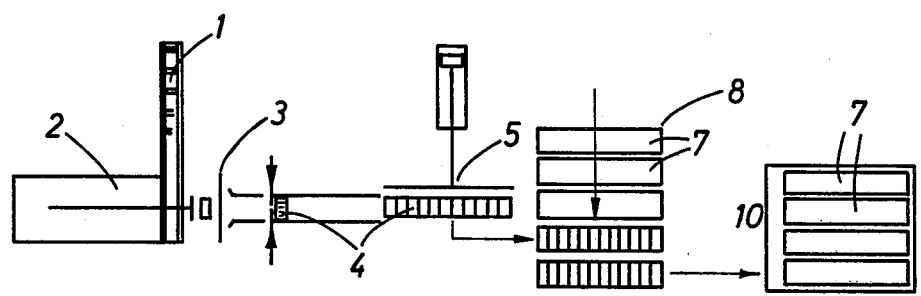
FIG. 1 is a flow diagram of a method of preserving and packing pieces of cheese according to our invention.

As shown in FIG. 1, pieces of cheese 1 ready for preserving and packing are fed to a conventional automatic packing device 2 and wrapped and shaped in a wrapping foil 3, e.g. an aluminum foil. The wrapped pieces are then fed directly from the packing device 2 to a sterilization container 7, which can be held by a clamping device 5 during the feeding operation. The end 8 of this container is already closed. When the container 7, which is only one of several such containers, is filled with wrapped pieces of cheese, it is fed to a transport basket 10, carried for instance on a conveyor belt. The basket 10 can be loaded with several containers 7. The filled transport basket 10 is conveyed to an aging room R, and here the wrapped pieces 4 of cheese assembled in the sterilization container 7 are stored under climatically optimal conditions and brought to the desired degree of aging, e.g. three quarters of a complete aging period (the time after which the cheese will start deteriorating in taste and quality). The sterilization container 7 is not closed while this aging is going on in room R. When the desired degree of aging has finally been obtained, the sterilization container 7, preferably still loaded on transport basket 10, is conveyed to a closing station V and is airtightly sealed. It is then conveyed into a sterilization room St which can house one or several sterilization containers 7. The sterilization of the cheese is accomplished at a temperature about 90°C and for a period of 30 to 50 minutes. The container 7 is then brought to a cooling room K so that the softened cheese mass can harden quickly. A spraying tunnel 12 or a dip tank filled with ice water (not shown in the drawing) can be used for this purpose. The packing of the wrapped pieces of cheese in an airtight packing material follows immediately after this cooling operation. The sterilization container 7 is emptied and the individual wrapped and sterilized pieces of cheese are deposited one at a time on the conveyor belt of a packing device 15 and there enclosed by a cup-shaped piece of an airtight sealable packing material 16. A marketable package of each individual piece of cheese can be obtained by enclosing the sealed cup-shaped package 16 in a box or can in the packing step 17, e.g. one of the known wooden boxes 18 used for encasing pieces of wrapped cheese. The wrapped, sterilized, airtightly packed, and encased piece of cheese is then ready to be put on the market. It is durable for several months, and its taste and aroma are subject to only minor changes.

The taste of the cheese can be improved by continuing the aging process while the pieces of cheese are assembled in the sterilization container. However, such a secondary aging process is not necessary. The pieces can be wrapped and assembled in the container after the desired degree of aging has been obtained. On the other hand, if this sequence is used, the cheese should not be aged to a high degree.

The cooling step is primarily used to speed up the packing and preservation operation.

The wrapped pieces of cheese can also be slowly cooled to room temperature while they are still assembled in the sterilization container, e.g. while stored in a conventional storage area or cooling room. It is important, however, that the airtightly enclosed wrapped pieces of cheese are airtightly packed immediately after their removal from the sterilization container so that the sterilized wrapped pieces of cheese will not be contaminated again by bacteria. The airtight packing material used for this purpose preferably is a synthetic foil which can be shaped to a cup and heat-sealed, thereby airtightly enveloping a wrapped piece of cheese. A sterilized tin can or similar box-shaped container can also be used. However, pre-shaped cups and boxes are comparatively expensive packing materials. Preferably, this packing step is performed in a decontaminated and sterilized cooling room, so that the individual wrapped pieces of cheese will not be contaminated during the time from the removal of the wrapped pieces from the sterilization container to the packing of the same in the airtight packing materials.

Figure 2:
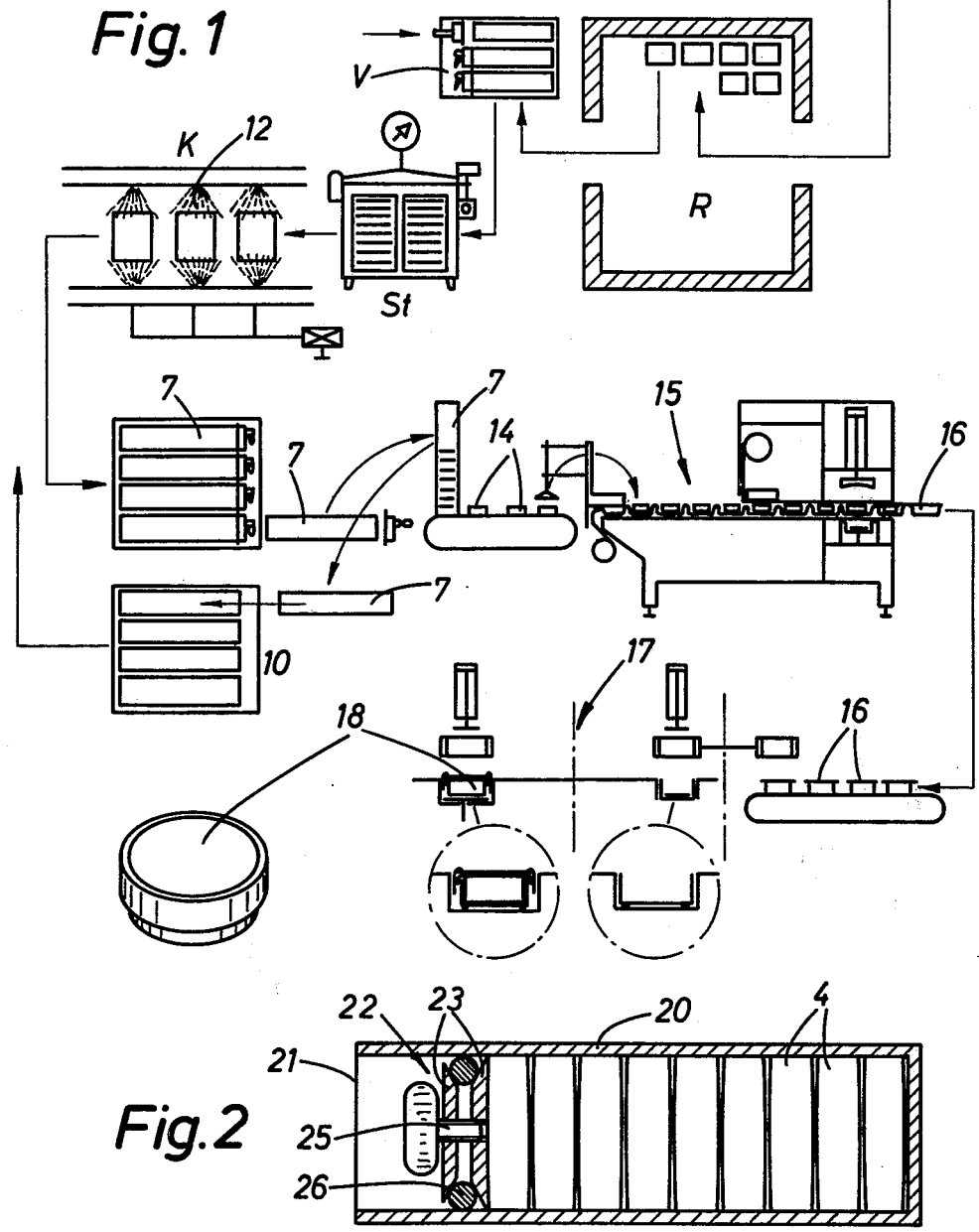
FIG. 2 is a longitudinal cross-section of a sterilization container employed in the the practice of our invention.

In FIG. 2 a sterilization container is shown which consists of a tube-shaped member 20 having at least one open end 21. The cross-section of the member corresponds well with the cross-section of a wrapped piece of cheese to be assembled and sterilized in container 20. It can be circular, rectangular, sectoral or of any other convenient shape. The wrapped pieces of cheese 4 are pushed into and assembled very closely together in the sterilization container 20. A slidable closure means 22 which can be locked at a selected location is necessary because of the varying thicknesses of the individual wrapped pieces of cheese. When the filling of the container is complete the closure means can be used to press the assembled pieces lightly so that a uniform mutual pressure is exerted between the individual pieces. The closure means 22 can then be used to seal off the container airtightly. Discs 23 are moved against each other along a common shaft 25 on which they are axially adjustably mounted. Shaft 25 is a screw spindle by means of which the discs 23 can be made to approach each other. Angular sealing element 26, made for instance of rubber, disposed between the tapered portions of the discs 23 whereby the inner surface of the tubular member 20, is thereby pressed against the tapered portions and the inner surface of the member 20 and an airtight seal can be obtained. Both ends of the sterilization container can be provided with such adjustable and slidable closure means. Other suitable airtight closure means, e.g. of the hinged or screw-type variety, can of course also be used.

The sterilization container 20 can also be provided with a handle so that it will be easier to carry and utilize generally. This handle can be placed on the outer wall of the container, preferably on at least one of the two ends of the container, so that the transport of the container on conveyor belts of slide or roll type will not be obstructed.

The sterilization container is preferably made of aluminum or stainless steel. Its size or capacity can be varied considerably, but a quantity of 20 to 40 pieces of cheese seems to be ideal container capacity.

We claim:

1. A method of preserving and packaging pieces of soft cheese, comprising the steps of wrapping each piece of cheese in foil, placing a plurality of pieces of cheese so wrapped in a hermetically sealable container, allowing said pieces to age for a period on the order of weeks in said container without sealing same, thereafter hermetically sealing the container, placing the sealed container in a sterilization chamber and exposing same in said chamber to an elevated sterilization temperature for a period of 30 to 50 minutes, withdrawing the container from said chamber at said elevated temperature, cooling the container with said pieces inside, removing the wrapped pieces from the container, and immediately inserting said pieces with their foil wrappings in airtight packages.

* * * * *